United States Patent
Jung et al.

(10) Patent No.: US 12,341,460 B2
(45) Date of Patent: Jun. 24, 2025

(54) POSITION SENSOR OF MOTOR

(71) Applicant: YURA TECH CO., LTD., Sejong-si (KR)

(72) Inventors: Jae Moon Jung, Asan-si (KR); Byung Wook Kwon, Seoul (KR); Jin Seok Jang, Sejong-si (KR); Ji Hoon Park, Jeonju-si (KR)

(73) Assignee: YURA TECH CO., LTD., Sejong-si (KR)

( * ) Notice: Subject to any disclaimer, the term of this patent is extended or adjusted under 35 U.S.C. 154(b) by 207 days.

(21) Appl. No.: 18/271,256

(22) PCT Filed: Sep. 23, 2021

(86) PCT No.: PCT/KR2021/012973
§ 371 (c)(1),
(2) Date: Jul. 7, 2023

(87) PCT Pub. No.: WO2022/149689
PCT Pub. Date: Jul. 14, 2022

(65) Prior Publication Data
US 2024/0063734 A1    Feb. 22, 2024

(30) Foreign Application Priority Data
Jan. 7, 2021    (KR) .................. 10-2021-0002049

(51) Int. Cl.
*H02K 11/38*    (2016.01)
*G01D 11/24*    (2006.01)
(Continued)

(52) U.S. Cl.
CPC ............ *H02P 6/185* (2013.01); *G01D 11/245* (2013.01); *H02K 11/215* (2016.01); *H02K 11/40* (2016.01)

(58) Field of Classification Search
CPC ...... H02K 11/38; H02K 11/215; B33Y 10/00; H02P 6/185; G01D 11/245
See application file for complete search history.

(56) References Cited

U.S. PATENT DOCUMENTS 6,111,378 A * 8/2000 LeMay .................. H02K 11/38
318/443
2016/0372987 A1    12/2016 Tejano et al.
(Continued)

FOREIGN PATENT DOCUMENTS

DE    102018216966 A1    4/2020
JP    06165465    6/1994
(Continued)

OTHER PUBLICATIONS

European Search Report—European Application No. EP21917851.4 issued on Nov. 5, 2024, citing US 2016/0372987, DE 10 2018 216 966, and US 2018/0180498.
(Continued)

*Primary Examiner* — Cortez M Cook
(74) *Attorney, Agent, or Firm* — CANTOR COLBURN LLP (57) ABSTRACT

A position sensor of a motor includes: a housing in which a hollow is formed and an accommodation space is formed as surrounding the hollow; a ground ring formed through an inner circumferential surface of the housing; a first PCB installed in the accommodation space and formed with a first circuit part; an induction unit facing the first PCB and rotates; a connecting bushing embedded in the housing and electrically connected to the ground by a fastening member; and a relay unit installed in the accommodation space and relaying the ground ring and the connection bushing. The ground ring is formed with a body formed through the inner circumferential surface, a contact part formed on one side of
(Continued)

the body and disposed of in the hollow, and a first connection part extending from the other side of the body and contacting the relay unit.

10 Claims, 7 Drawing Sheets

(51) Int. Cl.
*H02K 11/215* (2016.01)
*H02K 11/40* (2016.01)
*H02P 6/185* (2016.01)

(56) References Cited

U.S. PATENT DOCUMENTS

2018/0180498 A1    6/2018    Murakami et al.
2020/0353684 A1*   11/2020   Dudley .................. B33Y 10/00

FOREIGN PATENT DOCUMENTS

| JP | 06249607 | 9/1994 |
| JP | 2001305150 A | 10/2001 |
| KR | 20190064107 A | 6/2019 |

OTHER PUBLICATIONS

International Search Report—PCT/KR2021/012973 dated Jan. 3, 2022.

* cited by examiner

POSITION SENSOR OF MOTOR

FIELD OF THE INVENTION

The present invention relates to a position sensor, and more specifically, to a position sensor of a motor installed on one side of a motor for a vehicle and measuring a position through a change in a magnetic field.

BACKGROUND ART vehicles or hybrid vehicles, brushless motors that do not use brushes are used, and in such configurations, a position sensor is necessarily included to check the present position of the motor.

The coil and the rotor are coupled to the shaft, and a change in the inductance value of the coil caused by a change in the area of the metallic system of the rotor formed on the surface opposing to the coil is converted into an electrical signal so that a position sensor in prior arts can detect the rotational displacement of the shaft.

At this point, since the magnitude of the voltage induced in the rotor is proportional to the magnitude of the magnetic field applied to the coil, a high voltage is applied to the stator for precise position detection. Therefore, there are problems where the efficiency is decreased and where there are design constraints and increased production costs caused by using a motor more significant than a specific size to secure sufficient inductance.

In addition, an induced voltage is generated on the shaft according to electrical control for controlling the speed of the motor. When the induced voltage of the shaft reaches a specific level or higher, it is discharged to the ground through the bearing, causing problems such as spark generation and bearing damage. Because of this, conventionally, a shaft ground ring for discharging this voltage to the ground is used.

Accordingly, although the need and demand for the miniaturization of electric vehicle motors are significantly increasing, the space occupied by electric vehicle motors increases, resulting in problems such as increased constraints of space utilization for and design for vehicles.

SUMMARY OF THE INVENTION

Problem

Embodiments of the present invention have been made to solve the above problems, and an object of the present invention is to realize the miniaturization of a motor for a vehicle by integrally forming a ground ring while not increasing the voltage level of a transmitting pattern.

Solution

A position sensor of a motor of an exemplary embodiment of the present invention comprises: a housing in which a hollow is formed and an accommodation space is formed as surrounding the hollow; a ground ring formed through an inner circumferential surface of the housing; a first PCB installed in the accommodation space and formed with a first circuit part to which a voltage is applied; an induction unit that faces the first PCB and rotates; a connecting bushing embedded in the housing and electrically connected to the ground by a fastening member; and a relay unit installed in the accommodation space and relaying the ground ring and the connection bushing electrically, wherein: the ground ring is formed with a body formed through the inner circumferential surface of the housing, a contact part formed on one side of the body and disposed of in the hollow, and a first connection part extending from the other side of the body and contacting the relay unit in the accommodation space, thereby discharging an induced current generated by a rotational motion of a shaft passing through the hollow to the ground.

The first circuit part can be formed with a transmitting pattern to which a voltage is applied from the outside and a plurality of receiving patterns to which voltages having different phases are applied by rotational motion of the induction unit.

The accommodation space can be formed by being divided into a first accommodation space in which the first PCB is positioned and a second accommodation space in which the relay unit is positioned to have the first PCB and the relay unit installed separately, and the connecting bushing can be formed with a mounting part, which is embedded in the housing and fastens with a fastening member, and a second connection part, which extends from the mounting part and contacts with the relay unit in the second accommodation space so that it can be electrically connected to the contact part through the relay part.

The position sensor of a motor can further comprise a terminal electrically connecting the first circuit part and an external device, and it is preferable that a first through-hole electrically connecting the first circuit part and the terminal is formed on one side of the first PCB.

The induction unit can be formed with a fixed ring, fixed to an outer circumferential surface of the shaft, and an induction vane, extending from the fixed ring and intermittently formed to generate an induced voltage in the plurality of receiving patterns.

The relay unit can be installed in the second accommodation space and be formed with a second PCT in which a second circuit part connected to the first connection part and the second connection part is formed, or it can be installed in the second accommodation space and is formed of a conductor unit contacting the first connection part and the second connection part.

The position sensor of a motor further comprises a cover unit formed to cover the first accommodation space and the second accommodation space, wherein it is preferable that the cover unit is formed with a top cover formed on one side of the first accommodation space and a coating layer formed on one side of the second accommodation space.

The conductor portion can be insert-injected inside the housing to be formed in the accommodation space.

Effect

As shown above, according to the exemplary embodiments of the present invention, various effects, including the following, can be expected. However, this invention doesn't need to exhibit all these effects to be valid.

The position sensors of motors, according to the exemplary embodiments of the present invention, by adopting a way of detecting the position through the phase difference of the voltage waveform applied to the receiving pattern, achieve miniaturization by using fewer inductors and prevent temperature rise in the position sensors due to resistance reduction by reducing the number of turns in the transmitting pattern.

Accordingly, measurement accuracy can be improved by effectively canceling the magnetic field induced in the receiving pattern due to the eddy current caused by increasing only the frequency of the transmitting pattern's voltage without increasing the voltage of the transmitting pattern.

In addition, it is possible to prevent a short circuit with peripheral components and the inflow of impurities by accommodating the first PCB and the relay unit in the housing and forming the cover unit on one side of the accommodating space, and thus a more stable electrical connection is possible to improve the product's reliability and durability.

In addition, the relay unit is installed in the accommodation space and is formed integrally with a first PCB measuring the position of the motor so that a separate process for fixing the ground ring can be excluded, thereby improving product productivity and realizing miniaturization of the motor.

In addition, by arranging the induction unit on the outside of the housing to prevent temperature rise due to rotation of the position sensor, the temperature measurement accuracy can be improved, and the product's life can be remarkably extended.

DETAILED DESCRIPTION OF THE PREFERRED EMBODIMENTS

Hereinafter, exemplary embodiments of the present invention are described in detail with reference to the drawings. However, in the description of the present invention, detailed descriptions for the well-known functions or configurations are omitted in order not to disturb the gist of the present invention, and for convenience of description, the direction in which the shaft extends through the hollow is defined as an extension direction X, the direction perpendicular to the central axis of the hollow is defined as a radial direction Y.

In addition, since the first and second embodiments of the present invention can comprise the same configuration for the same purpose, the configuration described for the first embodiment is not repeatedly described for the second embodiment to avoid duplication of description, and the same reference number is used for the same configuration in the first and second embodiment.

Figure 1:
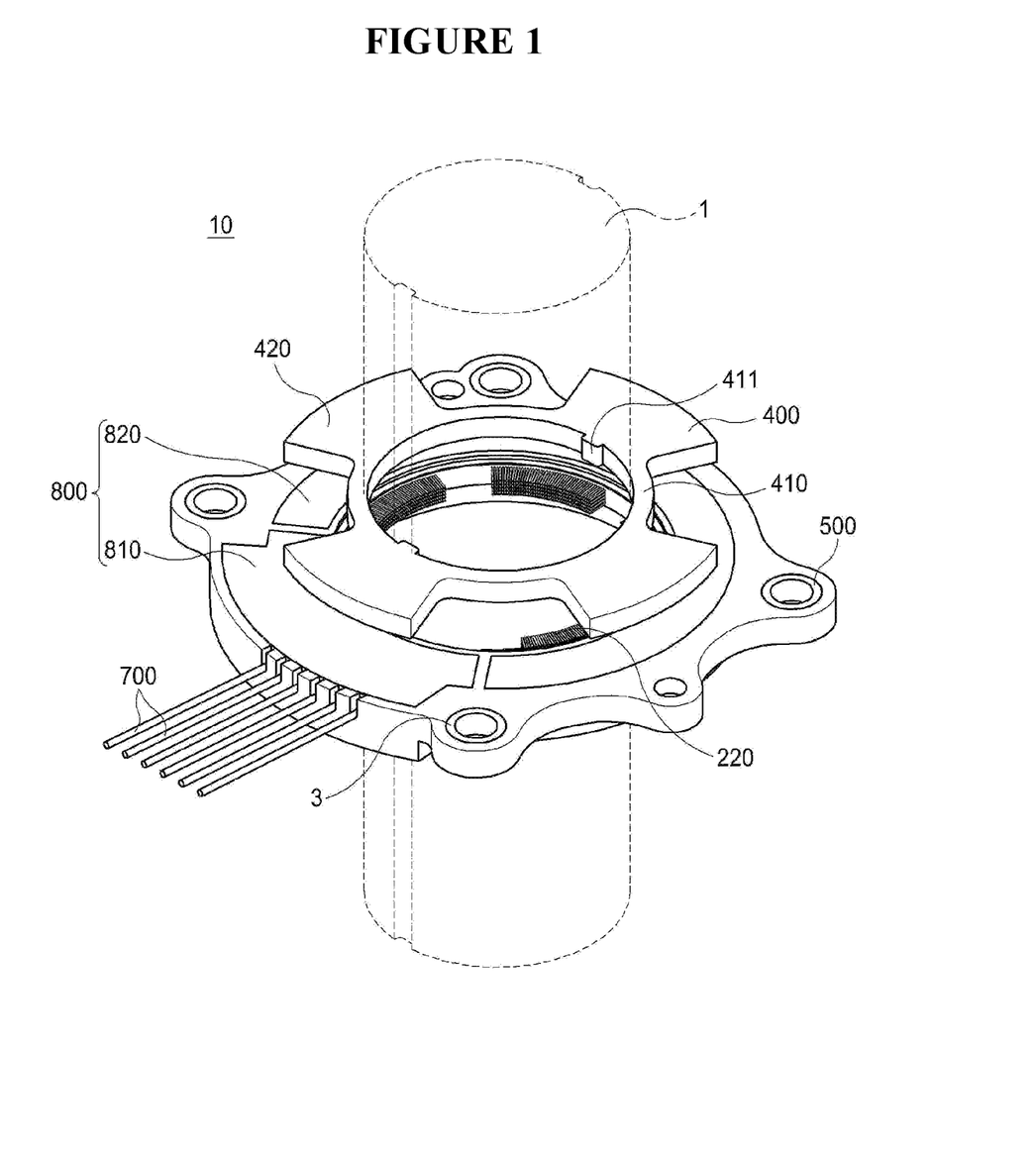
FIG. 1 illustrates a perspective view of a position sensor of a motor according to a first embodiment of the present invention.
Figure 2:
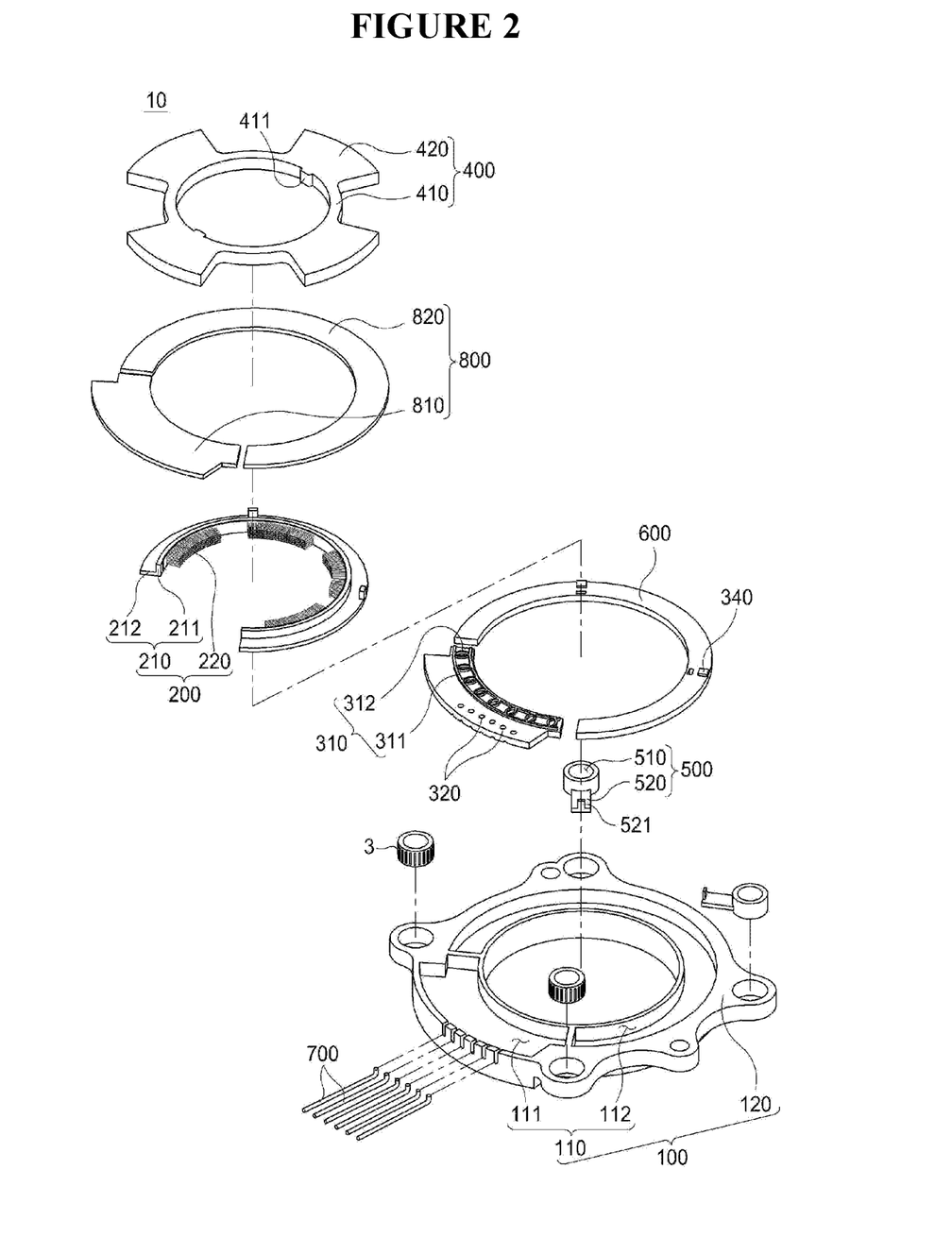
FIG. 2 illustrates an exploded perspective view of FIG. 1.
Figure 3:
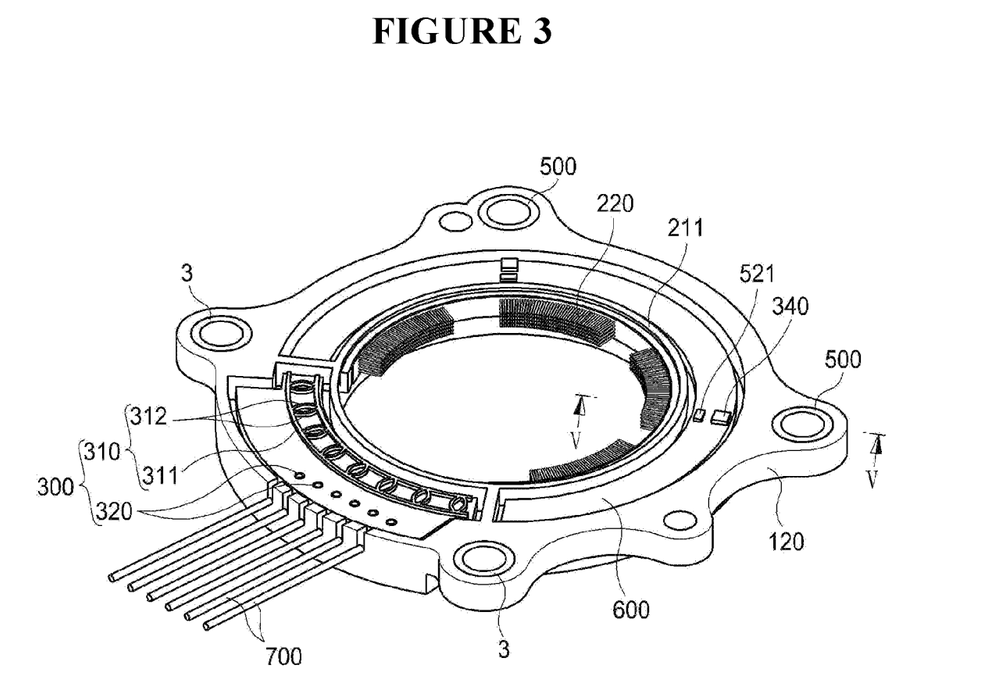
FIG. 3 illustrates a perspective view of FIG. 1 excluding the induction unit and the cover unit.
Figure 4:
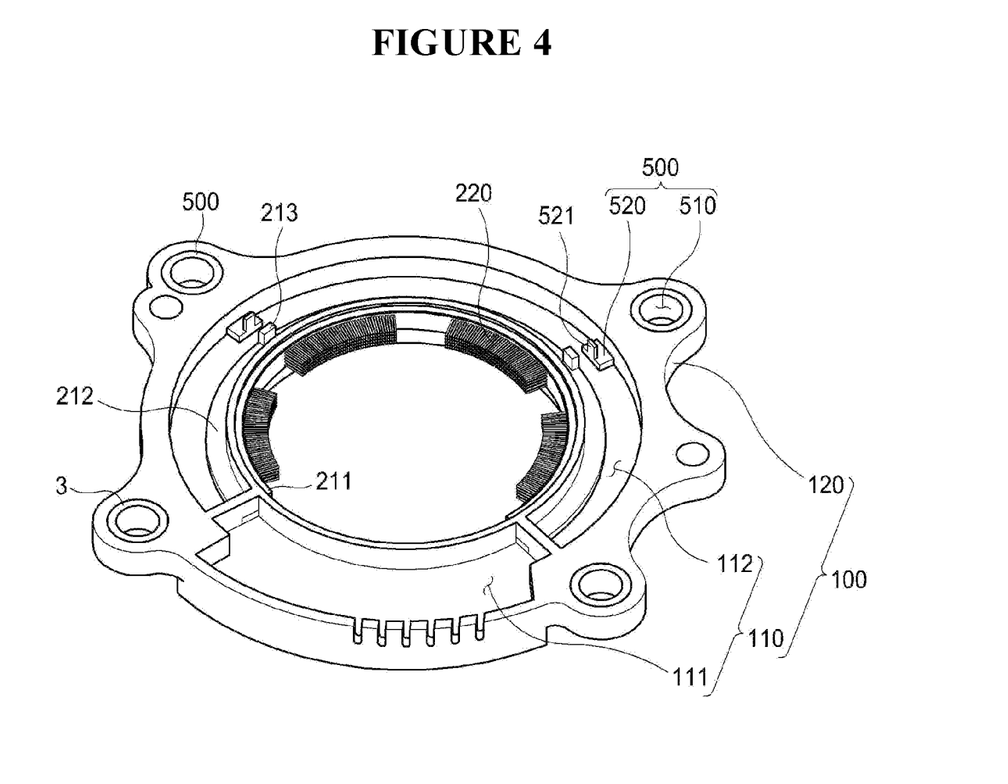
FIG. 4 illustrates a perspective view of FIG. 3 excluding the first PCT and the relay unit.
Figure 5:
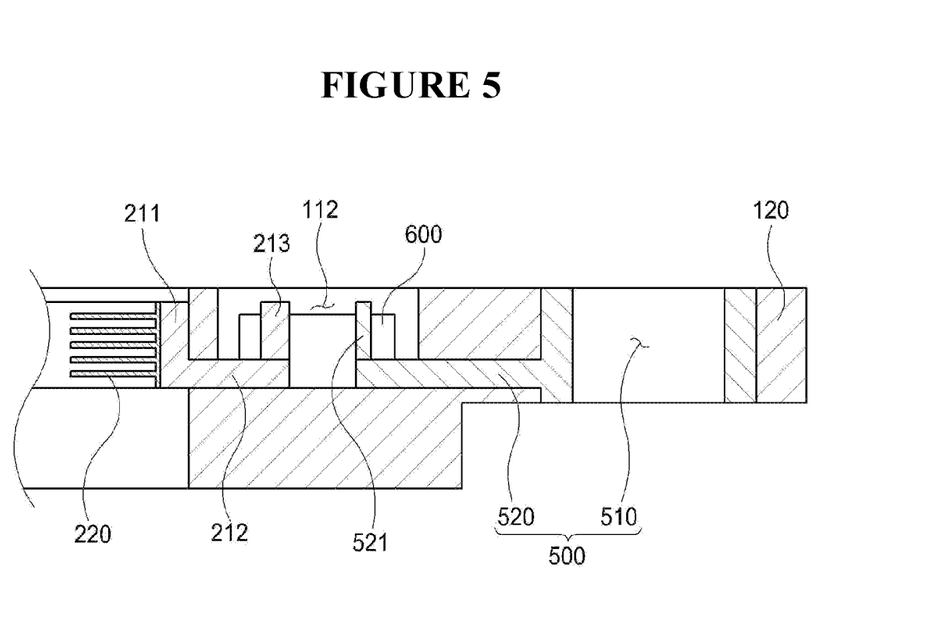
FIG. 5 illustrates a cross-sectional perspective view in the direction V-V of FIG. 3.
Figure 6:
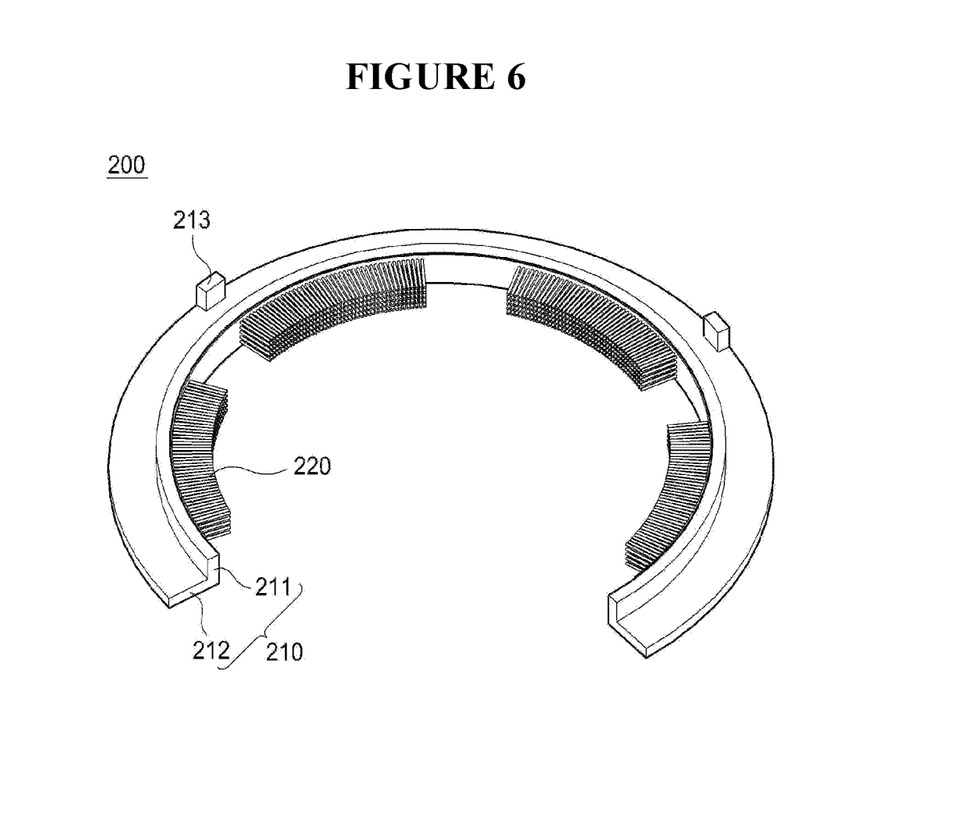
FIG. 6 illustrates a perspective view of the ground ring of FIG. 2.
Figure 7:
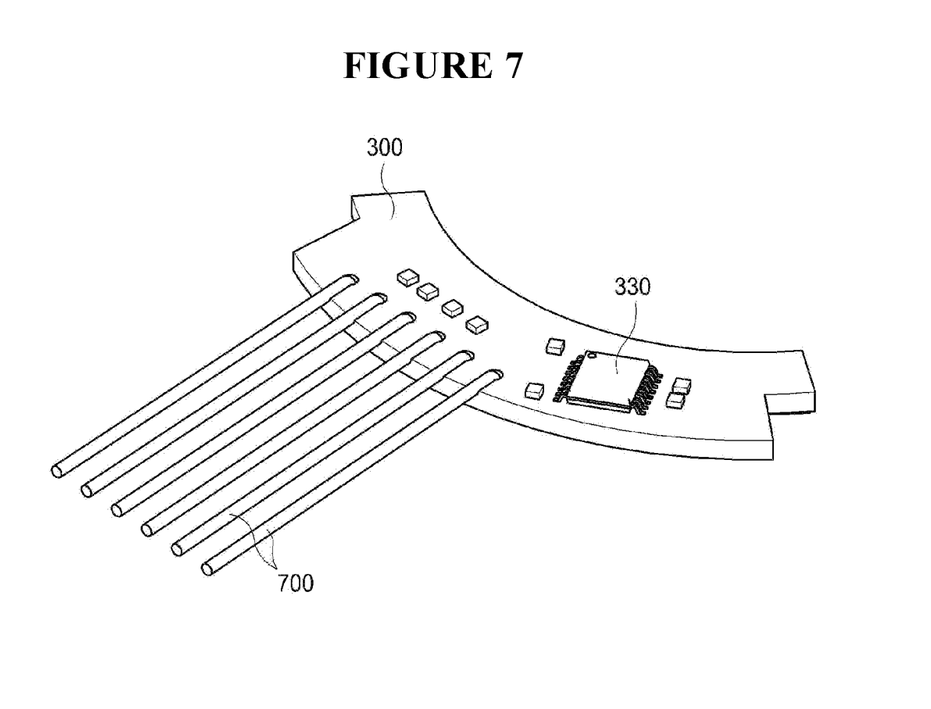
FIG. 7 illustrates a perspective view of the first PCT of FIG. 2 in another direction.

FIG. 1 is a perspective view of a position sensor of a motor according to a first embodiment of the present invention, FIG. 2 is an exploded perspective view of FIG. 1, FIG. 3 is a perspective view of FIG. 1 excluding an induction unit and the cover unit, FIG. 4 is a perspective view of FIG. 3 excluding the first PCT and the relay unit, FIG. 5 is a cross-sectional perspective view in the direction V-V of FIG. 3, FIG. 6 is a perspective view of the ground ring of FIG. 2, and FIG. 7 is a perspective view of the first PCT of FIG. 2 in another direction.

Referring to FIGS. 1 to 7, a position sensor 10 of a motor of the first embodiment of the present invention comprises a housing 100 in which a hollow is formed and an accommodation space 110 is formed as surrounding the hollow, a ground ring 200 formed through an inner circumferential surface of the housing 100, a first PCB 300 installed in the accommodation space 110 and formed with a first circuit part 310 to which a voltage is applied; an induction unit 400 that faces the first PCB 300 and rotates, a connecting bushing 500 embedded in the housing 100 and electrically connected to the ground by a fastening member, and a relay unit 600 installed in the accommodation space 110 and relaying the ground ring 200 and the connection bushing 500 electrically, wherein the ground ring 200 is formed with a body 210 formed through the inner circumferential surface of the housing 100, a contact part 220 formed on one side of the body 210 and disposed of the, and a first connection part 230 extending from the other side of the body 210 and contacting the relay unit 600 in the accommodation space, 110 thereby discharging an induced current generated by a rotational motion of a shaft 1 passing through the hollow to the ground.

Wherein it is preferable to further include a terminal 700 connecting the first circuit part 310 and an external device electrically and a cover unit 800 formed to cover the first and second accommodation spaces 111, 112, and the relay unit 600 can be formed with a second PCB 600 in which a second circuit part 610 is formed.

A position sensor 10 of a motor of an exemplary embodiment of the present invention aims to be installed on one side of the motor, to measure the present position of the motor by the phase difference of induced voltages having different phases applied by the induction unit 400, and to realize miniaturization of the motor by the ground ring 200 formed on one side of the sensor.

The housing 100 has a hollow through which the shaft 1 passes, and an accommodation space 110 in which the first PCB 300 and the relay unit 600 are accommodated is formed as surrounding the hollow so that the ground ring 200 removing the induced voltage generated by the shaft 1 and the first PCB 300 serving as a stator the position sensor 10 of the motor can be integrally formed.

Wherein the hollow is formed more expansive than the cross-sectional area of the shaft 1 to prevent contact between the housing 100 and the shaft 1 so that only the contact part 220 formed inside the hollow can contact with the outer circumferential surface of the shaft 1 at a pre-designed position.

The accommodation space 110 is formed in an annular shape surrounding the hollow and is divided into a first accommodation space 111 in which the first PCB 300 is installed and a second accommodation space 112 in which the relay unit 600 is installed. Therefore, preferably, the first and second accommodation spaces 111, 112 have an arc shape, which is a portion of the annular shape, respectively, and the second accommodation space 112 is formed expander than the first accommodation space to maximize the contact area between the contact part 220 and the shaft 1.

In addition, the housing 100 is formed with an extension part 120 in which a bushing 3 extending along the outer circumferential surface thereof and being fixed to the motor as a fastening member is embedded, wherein, preferably, the extension part 120 is formed in all directions to fix the housing 100 stably, and preferably, the housing 100 is formed of a plastic material capable of insert injection molding to be integrally formed with the ground ring 200 and the connection bushing 500.

Therefore, the bushing 3 is embedded inside the extension part 120, and the bushing 3 formed outside the second accommodation space 112 among the embedded bushings 3 is formed as a connection bushing 500 having a second connection part 520 formed in the second accommodation space 112.

Wherein the bushing 3 in which the hollow is formed is embedded in the housing 100 and makes more firmly fixing by reinforcing physical rigidity when the housing 100 is fixed by the fastening member, and the connection bushing 500 has the same role as the bushing 3 and is formed with a second connection part 520 electrically connected to the relay unit 600, which will be described again later.

The ground ring 200 is formed with a body 210 formed through the inner circumferential surface of the housing 100, a contact part 220 formed on one side of the body 210 and disposed of in the hollow, and a first connection part 230 extending from the other side of the body 210 and formed in the accommodation space 110, thereby transmitting the induced voltage generated by the rotational motion of the shaft 1 installed in the hollow.

The body 210 is formed with an inner body 211 formed to be exposed to the hollow by passing through the inner circumferential surface of the housing 100 and an outer body 212 formed in the second accommodation space 112, wherein the inner body 211 protrudes in an extension direction X than the outer body 212 to provide a space in which the contact part 220 is formed, and the inner circumferential surface of the housing 100 and the outer surface of the inner body 211 are brought into contact to strengthen the fixing force between the housing 100 and the ground ring 200.

To put it another way, since the body 210 is inevitably formed through the inner circumferential surface of the housing 100 to discharge the induced voltage generated by the rotational motion of the shaft 1 to the ground, the contact area with the housing 100 by protruding the inner body 211 is increased to secure a certain or more bonding force with the housing 100.

The contact part 220 is formed on the inner surface of the inner body 211 and contacts with the outside of the shaft 1 passing through the hollow. Specifically, the contact part 220 is formed of a conductive filament or a conductive wire to remove the induced voltage generated in the shaft 1, and has elasticity to stably contact with the outside of the shaft 1 regardless of forward and reverse rotation of the shaft 1, and is formed of carbon fiber to maintain a certain level of durability and lifespan even during repeated rotation, preferably.

A first connection part 230 extends from the outer body 212 to the second accommodation space 112 and is electrically connected to the relay unit 600. In the position sensor 10 of the motor of the first embodiment, since the relay unit 600 is formed of the second PCB 600, preferably the first connection part 230 is formed as protruding in the extension direction and passing through the second PCB 600 for connecting to the second circuit layer in the second PCB 600.

Wherein the ground ring 200 may be integrally formed with the housing 100 through insert injection molding, and accordingly, a process of separately fixing the ground ring 200 to the motor may be excluded, thereby simplifying the manufacturing process so that productivity can be improved, and miniaturization can be realized by reducing the size of the motor, and ultimately the fuel efficiency of the vehicle can be improved.

The first PCB 300 is formed with the first circuit part 310 formed as a pattern therein, a through hole 320 to which a terminal 700 is connected, and an IC unit 330 connected to a circuit unit so that the displacement of the induced voltage applied to a first circuit part 310 can be converted into an electrical signal and transmitted to an external device.

The first circuit part 310 is formed with a transmitting pattern 311 to which voltage is applied from the IC unit 330 and a plurality of receiving patterns 312 to which voltage is modulated by the induction unit 400 and transfers the phase difference of the induced voltages having different phases applied to the receiving patterns 312 to an external device as an electrical signal.

Therefore, the receiving patterns 312 are formed of a plurality of patterns having different shapes to apply voltages having different phases and, preferably, are formed with two patterns, an induced voltage having a phase of a cosine wave and a voltage having a phase of a sine wave, having a phase difference of 90 degrees.

Specifically, the phases of the voltage of the cosine wave and the voltage of the sine wave applied to the two different receiving patterns 312 are continuously modulated according to the rotational motion of the induction unit 400, respectively, wherein the position is measured through the phase difference between the modulated voltages of the cosine wave and the sine wave.

Accordingly, the position sensor 10 of the motor of the present invention adopts a way of detecting a more accurate position through the phase differences of the voltages applied to two different receiving patterns 312 so that an increase in the magnitude of the voltage applied to the receiving patterns 312 can be not required.

Therefore, without increasing the magnitude of the voltage applied to the first PCB 300, only the frequency is increased, thereby effectively canceling the magnetic field induced in the receiving patterns 312 by the movement of the induction unit 400 so that the measurement accuracy can is improved. In addition, by measuring the position using a relatively less inductor, the number of turns of the transmitting pattern 311 can also be reduced, thereby realizing the miniaturization of the position sensor 10 of the motor.

Wherein as the number length of turns of the transmitting pattern 311 is reduced, the resistance is also reduced so that the temperature rise of the first PCB 300 can also be reduced, thereby providing improved durability and extended lifespan.

The IC unit 330 receives power from an external device, applies it to the transmitting pattern 311, receives each phase of the induced voltages applied to the plurality of receiving patterns 312 as an electrical signal, and returns it to the external device.

Wherein a through hole 320 is formed on one side of the first PCB 300 so that the terminal 700 connected to the external device can be more easily mounted. Accordingly, the through hole 320 allows the first circuit unit 310, connected to the IC unit 330, and the terminal 700 to be internally connected, passing through the first PCB 300. However, the first circuit part 310 connected to the terminal 700 may be variously changed according to design and is not separately shown in the figures.

The induction unit 400 is formed with a fixed ring 410, formed with a hollow to be fixed to the outside of the shaft 1, and induction vanes 420, extending from the fixed ring 410, and rotates together with the shaft 1, thereby modulating the induced voltage applied to the receiving patterns 312. To achieve this, the induction unit 400 is disposed of facing a mounting part, wherein the induction vanes 420 include a conductive material for modulation of the induced voltage and extend in the radial direction Y from the outer circumferential surface of the fixed ring 410 but are intermittently formed.

The fixed ring 410 is configured to be fixed to the outside of the shaft 1 and formed with a hollow having the same size as the cross-sectional area of the shaft 1, and a plurality of fixing protrusions 411 are formed to improve fixing force with the shaft 1 along the inside of the hollow at regular intervals.

The induction vanes 420 are formed symmetrically or asymmetrically with respect to the central axis of the shaft 1 to change the opposing area with time at a specific position of the first PCB 300 according to rotational motion.

In addition, the induction unit 400 is disposed at a predetermined distance from one outer side of the housing 100 to more effectively dissipate heat generated according to the rotational motion and is further formed with a structure such as a cover protecting the induction unit 400 on one side of the induction unit 400, preferably a side not facing the first PCB 300 to protect the induction unit 400.

Specifically, the induction vanes 420 of one embodiment are formed at intervals on the central axis of the shaft 1 to create a space apart from the neighboring induction vanes 420 and formed symmetrically in all directions so that the area of the induction vanes 420 facing at a specific position of the first PCB 300 over time can be repeatedly changed, according to the rotational motion of the induction unit 400.

However, this induction unit 400 is one of the exemplary embodiments, and the induction vanes 420 may be formed in various shapes.

The connection bushing 500 is formed with a fastening hole 510 through which a fastening member passes, and a second connection part 520 extending from one side of the fastening hole 510 and formed in a second accommodation space 112, so the connection bushing 500 is embedded in the extension part 120 of the housing 100 and connects the housing 100 to the body of the motor and is electrically connected to the contact part 220 through the second circuit part 610.

Specifically, the connection bushing 500 is formed to expose the fastening hole 510 in the extension part 120, and the second connection part 520, which extends from one side of the fastening hole 510, is formed in the second accommodation space 112 and passes through the housing 100 to connect to the second circuit part 610. Wherein to be easily electrically connected to the second circuit part 610, the second connection part 520 protrudes in the extension direction X and passes through the second PCB 600.

To put it another way, the connection bushing 500 is electrically connected to the second circuit part 610 on one side, receives an induced voltage generated by the rotational motion of the shaft 1, and discharges it to the ground via the fastening member passing through the fastening hole 510, thereby enabling discharge it stably without damaging other components.

In addition, the connection bushing 500 is integrally formed with the housing 100 through insert injection molding so that the manufacturing process can be simplified, and the second connection part 520 is firmly fixed so that it can be connected to the second circuit part 610 more stably.

Therefore, the position sensor 10 of the motor of the present invention does not increase the production cost by not using additional configurations by extensively using some of the bushings 3 fixed to the body of the motor as the connection bushing 500.

The relay unit 600 is a configuration to relay the electrical connection between the first connection part 230 and the second connection part 520 by installing in the second accommodation space 112, and the relay unit 600 of an exemplary embodiment is formed with the second PCB 600 configuring the second circuit part 610.

The second circuit part 610 formed inside the second PCB 600 is connected to the first connection part 230 and the second connection part 520 passing through the second PCB 600, respectively, so that the induced voltage generated by the shaft 1 can be removed, wherein it can be easily connected even when the positions of the first and second connection parts 230, 520 are spaced apart from each other since the second circuit part 610 can be formed to have various patterns according to the design.

In addition, due to a Zener diode 620 formed on one side of the second PCB 600, the voltage can be transmitted from the first connection part 230 to the second connection part 520, but the reverse voltage generated by the motor and applied through the second connection part 520 cannot be transmitted to the first connection part 230, so that the reverse voltage reversely transmitted from the body of the vehicle can be prevented, thereby securing safety.

To put it another way, the position sensor 10 of the motor of an exemplary embodiment allows the first and second connection parts 230, 520 to be more stably connected by forming the relay unit 600 with the second PCB 600, and safety to be ensured by blocking the transmission of the reverse voltage due to installing the Zener diode 620.

The cover unit 800 is a configuration to protect the first PCB 300 and the relay unit 600 from external foreign substances or impact by being formed on one side of the accommodation space 110, wherein the cover unit 800 can be formed to cover both the first and second accommodation spaces 111, 112 or any one of the first and second accommodation spaces 111, 112 as needed.

Preferably, to make the connection process between the terminal 700 and the first PCB 300 easier, a cover unit 800 like the housing 100 is formed on one side of the first accommodation space 111, and the coating layer 820 is formed in the second accommodation space 112 where the first and second connection parts 230, 520 passing through the second PCB 600 are exposed so that connecting portions where the first and second connection parts 230, 520 are connected with the second circuit part 610 can be fixed and that the second PCB 600 can be protected from the outside.

Wherein the coating layer 820 can be formed of epoxy, and the coating layer 820 filed in the second accommodation space 112 is formed by injecting a molten coating liquid and hardening it after the second PCB 600 is installed. Accordingly, the fixing force between the ground ring 200 and the housing 100 is supplemented, and the connecting portions where the first and second connection parts 230, 520 are connected with the second PCB 600 are also reinforced so that durability of the product can be improved.

However, the cover unit 800 can be formed of the top cover 810 or the coating layer 820 to both the first and second accommodation spaces 111, 112, and they may be used interchangeably depending on the design.

Therefore, the position sensor 10 of the motor of the present invention does not require an increase in the inductor by measuring the position through the phase difference of the induced voltage and realizes miniaturization of the motor by disclosing a new structure in which the ground ring 200 is integrally formed.

In addition, the voltage can be removed without increasing the number of components required by removing the voltage generated by the rotational motion of the shaft 1 through the connection bushing 500 fixing the housing 100, thereby solving the problem of increasing production costs.

Figure 8:
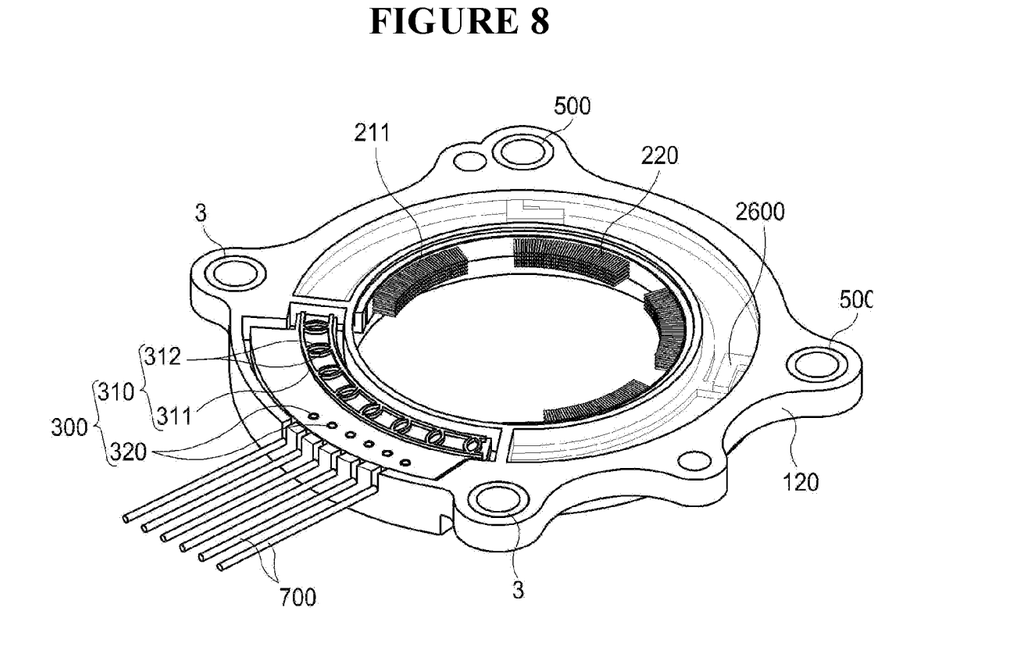
FIG. 8 illustrates a perspective view of the relay unit excluding the induction unit from the position sensor of a motor according to a second embodiment of the present invention.
Figure 9:
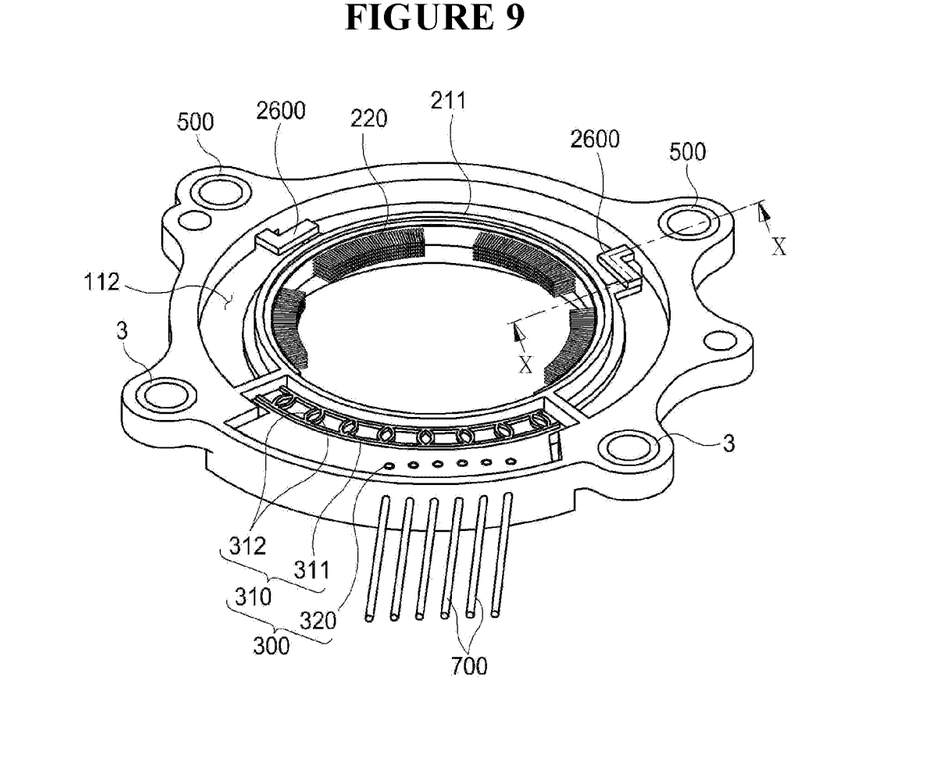
FIG. 9 illustrates a perspective view of FIG. 8 excluding the induction unit and the cover unit.
Figure 10:
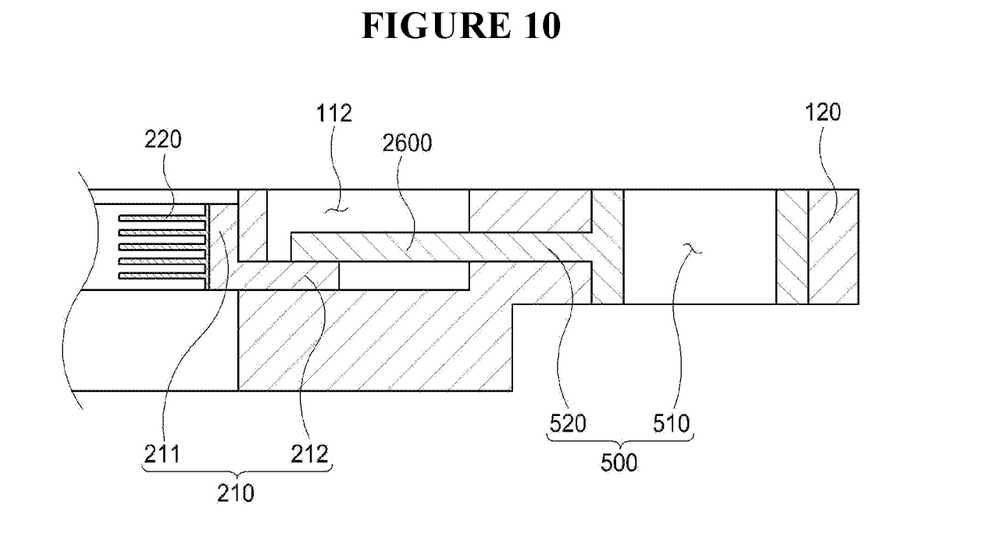
FIG. 10 illustrates a cross-sectional perspective view in the direction X-X of FIG. 9.

FIG. 8 is a perspective view of the relay unit excluding the induction unit from the position sensor of the motor of a second embodiment of the present invention, FIG. 9 is a perspective view of FIG. 8 excluding the cover unit, and FIG. 10 is a cross-sectional perspective view in the direction X-X of FIG. 9.

Referring to FIGS. 8 to 10, in the position sensor 20 of the motor of the second embodiment of the present invention, the relay unit 2600 relaying the electrical connection between the ground ring 200 and the connection bushing 500 is installed in the second accommodation space 112, and it is formed of a conductor unit 2600 in contact with the first connection part 230 and the second connection unit 520.

Since the position sensor of the motor of the second embodiment of the present invention has a different configuration of the relay unit 2600 compared to the position sensor 10 of the first embodiment, to avoid redundant description, only the relay unit 2600 will be described, and the same reference numbers will indicate the same configurations as those in the first embodiment for understanding.

The relay unit 2600 of the second embodiment is formed of a bus bar, terminal pin, or wire directly connecting the first connection part 230 and the second connection part 520, as a conductor unit 2600 electrically connectable. Wherein the conductor unit 2600 has only a structure connecting the first and second connection parts 230, 520 so that the weight of the motor can be further reduced and, ultimately, the fuel efficiency of the vehicle can be improved.

In addition, workability can be improved since the operator can visually check the connecting portions where the first and second connection parts 230, 520 are connected with the relay unit 2600, and by excluding the second PCB 600, cost and time required to produce products are reduced, resulting in productivity improvement.

Wherein the relay unit 600 be integrally formed by extending from the first connection part 230 or the second connection part 520 so that the connection process can be simplified, resulting in maximizing the productivity improvement effect of the product.

Therefore, the position sensor of the motor of the second embodiment of the present invention forms the relay unit 2600 as a conductor unit 2600 directly connected to the first and second connection parts 230, 520 so that the cost required to produce products can be reduced, and by integrating the relay unit 2600 with the first connection part 230 or the second connection part 520, processes for electrical connection such as brazing, welding, and fusion are minimized, resulting in improving workability and significantly improving product productivity.

Wherein the conductor unit 2600 is inserted and injected into the housing 100 during molding to be formed in the accommodation space 110; accordingly, the conductor unit 2600 can be installed inside the second accommodation space 112 without a separate cover unit 800, thereby further simplifying the production process.

In summary, the position sensor 10 of the motor of the present invention promotes miniaturization of the motor by forming the ground ring 200 that removes the induced voltage generated by the rotational motion of the shaft 1, and by disclosing new structures and various feasible configurations for this purpose, it allows for remarkably improving productivity and durability.

In the above, although preferred embodiments of the present invention have been described by way of example, the scope of the present invention is not limited only to such specific embodiments, and inventions that can be modified appropriately within the scope described in the claims fall within the protection scope of the present invention.

What is claimed is:

1. A position sensor of a motor comprising:
   a housing formed with a hollow and an accommodation space, which is formed as surrounding the hollow;
   a ground ring formed through an inner circumferential surface of the housing;
   a first PCB installed in the accommodation space and formed with a first circuit part to which a voltage is applied;
   an induction unit that faces the first PCB and rotates;
   a connecting bushing embedded in the housing and electrically connected to the ground by a fastening member; and
   a relay unit installed in the accommodation space and relaying the ground ring and the connection bushing electrically,
   wherein:
   the ground ring is formed with a body formed through the inner circumferential surface of the housing, a contact part formed on one side of the body and disposed of in the hollow, and a first connection part extending from the other side of the body and contacting the relay unit in the accommodation space, thereby discharging an induced current generated by a rotational motion of a shaft passing through the hollow to the ground.

2. The position sensor of a motor of claim 1, wherein:
   the first circuit part is formed with a transmitting pattern to which a voltage is applied from the outside and a plurality of receiving patterns to which voltages having different phases are applied by rotational motion of the induction unit.

3. The position sensor of a motor of claim 1, wherein:
   the accommodation space is formed by being divided into a first accommodation space in which the first PCB is positioned and a second accommodation space in which the relay unit is positioned to have the first PCB and the relay unit installed separately, and
   the connecting bushing is formed with a mounting part, which is embedded in the housing and fastens with a fastening member, and a second connection part, which extends from the mounting part and contacts with the relay unit in the second accommodation space, so that it is electrically connected to the contact part through the relay part.

4. The position sensor of a motor of claim 1, further comprising a terminal electrically connecting the first circuit part and an external device, wherein:
   a first through-hole electrically connecting the first circuit part and the terminal is formed on one side of the first PCB.

5. The position sensor of a motor of claim 2, wherein:
the induction unit is formed with a fixed ring, fixed to an outer circumferential surface of the shaft, and an induction vane, extending from the fixed ring and intermittently formed to generate an induced voltage in the plurality of receiving patterns.

6. The position sensor of a motor of claim 3, wherein:
the relay unit is installed in the second accommodation space and is formed with a second PCT in which a second circuit part connected to the first connection part and the second connection part is formed, and
a Zener diode for preventing reverse voltage is formed on the second PCB.

7. The position sensor of a motor of claim 1, wherein:
the relay unit is installed in the second accommodation space and is formed of a conductor unit contacting the first connection part and the second connection part.

8. The position sensor of a motor of claim 3, wherein:
further comprises a cover unit formed to cover the first accommodation space and the second accommodation space.

9. The position sensor of a motor of claim 8, wherein:
the cover unit is formed with a top cover formed on one side of the first accommodation space and a coating layer formed on one side of the second accommodation space.

10. The position sensor of a motor of claim 7, wherein:
the contact portion is formed of a filament having elasticity by being formed of carbon fiber or conductive fiber,
the conductor portion is insert-injected inside the housing to be formed in the accommodation space.

* * * * *